(12) United States Patent
Coli et al.

(10) Patent No.: US 11,271,649 B2
(45) Date of Patent: Mar. 8, 2022

(54) TRANSCEIVER TO TRANSCEIVER DIGITAL OPTICAL COMMANDS

(71) Applicant: FINISAR CORPORATION, Sunnyvale, CA (US)

(72) Inventors: Giuliano Coli, Sunnyvale, CA (US); Jingyun Zou, Sunnyvale, CA (US); Jing Yang, Sunnyvale, CA (US)

(73) Assignee: II-VI DELAWARE, INC., Wilmington, DE (US)

( * ) Notice: Subject to any disclaimer, the term of this patent is extended or adjusted under 35 U.S.C. 154(b) by 0 days.

(21) Appl. No.: 16/573,916

(22) Filed: Sep. 17, 2019

(65) Prior Publication Data

US 2020/0021362 A1 Jan. 16, 2020

Related U.S. Application Data

(63) Continuation of application No. 15/624,864, filed on Jun. 16, 2017, now Pat. No. 10,419,116.

(60) Provisional application No. 62/351,732, filed on Jun. 17, 2016.

(51) Int. Cl.
*H04B 10/25* (2013.01)
*H04B 10/079* (2013.01)
*H04J 14/02* (2006.01)
*H04B 10/69* (2013.01)
*H04B 10/077* (2013.01)

(52) U.S. Cl.
CPC ......... *H04B 10/25* (2013.01); *H04B 10/0779* (2013.01); *H04B 10/0799* (2013.01); *H04B 10/07953* (2013.01); *H04B 10/695* (2013.01); *H04J 14/0227* (2013.01)

(58) Field of Classification Search
CPC .. H04L 63/0428; H04L 63/102; H04W 12/02; H04W 12/082; H04W 12/12; H04W 12/126; H04W 12/63; H04W 4/029
See application file for complete search history.

(56) References Cited

U.S. PATENT DOCUMENTS

| | | | | |
|---|---|---|---|---|
| 3,536,839 | A * | 10/1970 | Prins | H04M 11/045 379/69 |
| 6,963,554 | B1 * | 11/2005 | Weigand | G06F 9/30083 370/347 |
| 8,181,867 | B1 * | 5/2012 | Bierbaum | G06Q 20/405 235/384 |
| 10,476,854 | B2 * | 11/2019 | Arora | H04L 63/0435 |
| 2008/0167846 | A1 * | 7/2008 | Bugenhagen | H04L 63/102 703/6 |
| 2008/0313461 | A1 * | 12/2008 | Detienne | H04L 63/123 713/170 |
| 2009/0172102 | A1 * | 7/2009 | Chesnutt | H04L 51/12 709/206 |
| 2012/0036250 | A1 * | 2/2012 | Vaswani | H04W 84/18 709/224 |
| 2015/0350177 | A1 * | 12/2015 | Sharp | G06Q 20/3227 726/6 |
| 2016/0182518 | A1 * | 6/2016 | Smith | H04L 63/10 726/3 |

(Continued)

*Primary Examiner* — Tanya T Motsinger
(74) *Attorney, Agent, or Firm* — Blank Rome LLP

(57) ABSTRACT

A system may include a first module at a far end, and an optical fiber coupled to the first module. The system may also include a second module at a near end that is configured to generate and transmit instructions to the first module to control operation of the first module.

19 Claims, 6 Drawing Sheets

(56) References Cited

U.S. PATENT DOCUMENTS

| | | | |
|---|---|---|---|
| 2017/0026802 A1* | 1/2017 | Bank | H04W 12/126 |
| 2017/0086070 A1* | 3/2017 | Henderson | H04L 63/0853 |
| 2017/0318456 A1* | 11/2017 | Vari | H04M 1/6033 |
| 2017/0366266 A1* | 12/2017 | Coli | H04B 10/07953 |
| 2018/0084413 A1* | 3/2018 | Lee | H04L 9/0891 |
| 2019/0109714 A1* | 4/2019 | Clark | H04L 9/3226 |
| 2019/0109821 A1* | 4/2019 | Clark | H04L 63/0272 |
| 2019/0109822 A1* | 4/2019 | Clark | H04L 63/0428 |
| 2019/0109848 A1* | 4/2019 | Clark | H04L 63/1441 |
| 2019/0238547 A1* | 8/2019 | Milden | G06N 20/00 |
| 2019/0331761 A1* | 10/2019 | Wynn | E02F 9/205 |

\* cited by examiner

TRANSCEIVER TO TRANSCEIVER DIGITAL OPTICAL COMMANDS

CROSS-REFERENCE TO RELATED APPLICATIONS

This application is a Continuation of U.S. patent application Ser. No. 15/624,864, filed Jun. 16, 2017, and claims priority to U.S. Provisional No. 62/351,732, filed Jun. 17, 2016, titled TRANSCEIVER TO TRANSCEIVER DIGITAL OPTICAL COMMANDS, both of which are incorporated herein by reference in their entirety.

FIELD

The embodiments discussed in the present disclosure are related to a Transceiver to transceiver digital optical commands

BACKGROUND

With the ubiquitous nature of computers and electronic data, network communication is important in the implementation of such networks. One aspect of such network communication is control of hardware and/or software within such a network.

The subject matter claimed herein is not limited to embodiments that solve any disadvantages or that operate only in environments such as those described above. Rather, this Background Section is provided to illustrate one example technology area where embodiments of the present disclosure described herein may be practiced.

SUMMARY

One or more embodiments of the present disclosure may include a system that includes a first module at a far end, and an optical fiber coupled to the first module. The system may also include a second module at a near end that is configured to generate and transmit instructions to the first module to control operation of the first module.

One or more embodiments of the present disclosure may include a method that includes transmitting sets of instructions or commands between two or more modules on the two sides of the same optical fiber link. In such a method, the two or more modules may execute independently from hosts served by the two or more modules. Additionally or alternatively, one of the modules may process sets of information from the other module or elsewhere that the other module can process for further actions, or store for use by one of the hosts.

One or more embodiments of the present disclosure may include a method to transmit sets of information, diagnostics, or commands between hosts on the two sides of the same optical fiber link, using a Transceiver to Transceiver Digital Optical Command ($T^2DOC$) interface, without affecting optical traffic they carry, nor adding additional load.

One or more embodiments of the present disclosure may include a method that may include transmitting first instructions (which may include queries) to a primary far end module to send diagnostic monitor data. The method may also include receiving diagnostic monitor data from the primary far end module, and determining whether the diagnostic monitor data is beyond a threshold. The method may additionally include sending, based on the diagnostic monitor data being beyond the threshold, second instructions to the primary far end module to take a specific action, such as turning off a first transmitter of the primary far end module. The method may also include sending, based on the diagnostic monitor data being beyond the threshold, third instructions to a secondary far end module to turn on a transmitter of the secondary far end module.

One or more embodiments of the present disclosure may include a method that may include establishing a receive chain using a forward error correction (FEC) chip. The method may also include transmitting first instructions to a far end module to enable optical loop back of data received at the far end module. The method may additionally include making a determination as to whether a bit error ratio (BER) based on the looped back data is within a threshold, and sending second instructions to the far end module to adjust a receive decision threshold until the BER is within the threshold. The method may also include communicating third instructions to the far end module to disable the optical loop back based on the BER being within the threshold.

The object and advantages of the embodiments will be realized and achieved at least by the elements, features, and combinations particularly pointed out in the claims.

Both the foregoing general description and the following detailed description provide examples and are explanatory and are not restrictive.

BRIEF DESCRIPTION OF THE DRAWINGS

Example embodiments will be described and explained with additional specificity and detail through the use of the accompanying drawings in which.

DESCRIPTION

The present disclosure relates to far end network control in, e.g., optical networks that include optoelectronic modules (hereinafter "module" or "modules") at opposite ends of optical links. In some embodiments, a near end module may control a far end module. For example, a near end module may send instructions to a far end module to perform certain tasks or to send certain data. Such instructions may be transmitted directly from one hardware component to the other without having a host or other external component required to interpret or implement the instructions. Additionally or alternatively, the instructions may be transmitted out of band with normal network traffic such that normal network traffic may be unaffected by the communication of the instructions.

Embodiments of the present disclosure are explained with reference to the accompanying drawings.

Figure 1:
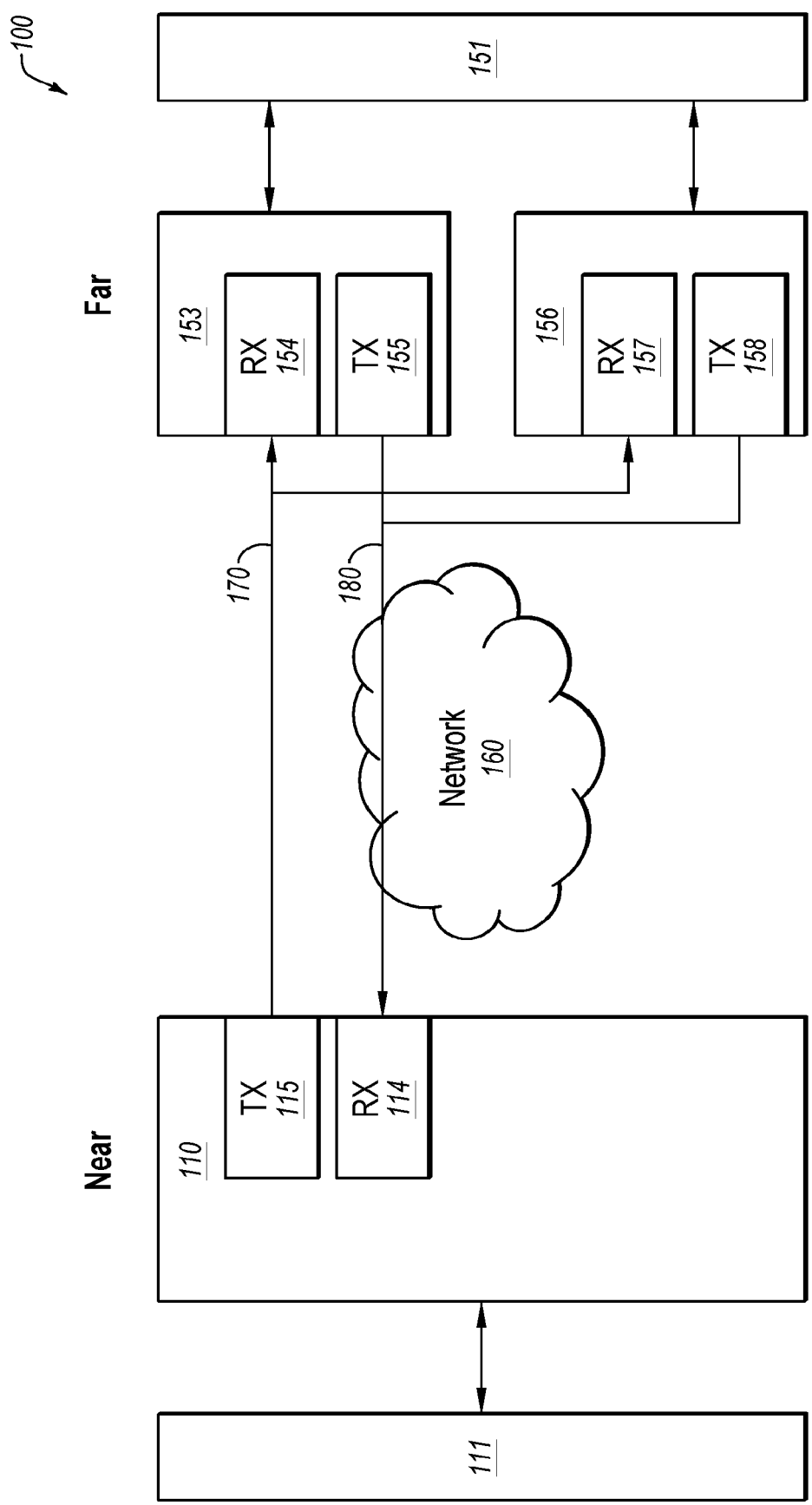
FIG. 1 is a block diagram of an example network system.

FIG. 1 is a block diagram of an example network system 100, in accordance with one or more embodiments of the present disclosure. For convenience in describing the network system 100, one side is labeled as "near" and the other as "far," however, such label does not connote actual physical distance or any order. Rather, it serves as a distinguishing characteristic to articulate one end of a communication channel of the network system 100 from another.

The network system 100 may include a first module 110 at the near end of the network system 100. The first module 110 may be in communication with a first host 111. The first host 111 may provide data, such as customer data, network management data, etc. to the first module 110 to be communicated over a network 160 to be received by a second module 153 and/or a third module 156 at the far end of the network system 110. The second module 153 may provide the data received from the first module 110 to a second host 151.

As used herein, the term "module" may refer to any physical device able to transmit and/or receive optical signals over a network. Examples of modules may include any variant of transceivers, single- or multi-lane active optical cables, transponders, board mounted optics, etc. As used herein, the term "host" may refer to a network device such as a switch, a router, a muxponder or other multiplexing device, etc. Stated another way, the host may be a network device that receives and/or processes data from customers, for network management, etc. The module may be the physical device that receives electrical signals from the host and converts those signals into optical signals to be transmitted across an optical fiber, or receives optical signals from across an optical fiber and converts the optical signals into electrical signals for the host.

In some situations, the first host 111 may not have direct access to hardware and/or software of the second module 153 and/or the third module 156. Instead, the first host 111 may generate a message that is provided to the first module 110, converted to an optical signal by the first module 110, transmitted to the second module 153 and/or the third module 156, the optical signal converted to an electrical signal by the second module 153 and/or the third module 156, and the electrical signal provided to the second host 151. The second host 151 may communicate the message to the second module 153 and/or the third module 156.

In some embodiments of the present disclosure, the first module 110 may communicate directly with the second module 153 and/or the third module 156. For example, the first module 110 may communicate instructions to perform certain tasks or may request certain data directly from the second module 153 and/or the third module 156, without having to send such instructions to the second host 151 to be communicated to the second module 153 and/or the third module 156. In these and other embodiments, such instructions may be communicated at a physical layer, or in terms of the Open Systems Interconnection (OSI) model, at Layer 1.

The network 160 may include any combination of optical fibers, modules, hosts, other network components, etc., such that an optical signal originating at the near end may be transmitted to the far end, and vice versa.

Traffic Recovery System

In some embodiments, instructions from the first module 110 to the second module 153 and/or the third module 156 may be utilized to implement a traffic recovery system. The second module 153 may include a receiver 154 and a transmitter 155. The third module 156 may include a receiver 157 and a transmitter 158. The network system 100 may include a first optical channel 170 from a transmitter 115 of the first module to the receiver 154 of the second module 153 and to the receiver 156 of the third module 156. The transmitter 155 of the second module 155 and the transmitter 158 of the third module 156 may communicate signals over a second optical channel 180 to a receiver 114 of the first module 110. A splitter may be provided at or near the far end of the first optical channel 170 to optically couple the transmitter 115 to both of the receivers 154 and 157. A combiner may be provider at or near the far end of the second optical channel 180 to couple both of the transmitters 155 and 158 to the receiver 114. The second module 153 may be designated and/or operated as a primary module, while the third module 156 may be designated and/or operated as a secondary or redundant module that operates if and when the second module 153 fails. Such a full duplex configuration may be extended to optic fiber configurations that use coarse wavelength division multiplexing (CWDM) or dense wavelength division multiplexing (DWDM) transmitters, receivers and links, and/or bi-directional transmitters, receivers and/or links.

In some embodiments, the first module 110 may monitor signal strength of the optical signal received at the receiver 114 from the transmitter 155. If the first module 110 detects that the received optical power is below a threshold, the first module 110 may send instructions to the second module 153 and/or the third module 156. In particular, the first module 110 may instruct the second module 153 to power off the transmitter 155. Additionally or alternatively, the first module 110 may instruct the third module 156 to power on the transmitter 158. In these and other embodiments, the instructions from the first module 110 may be provided directly to the second module 153 and separately, directly to the third module 156. In these and other embodiments, transmission of data from the second host 151 may have originally been primarily transmitted by the second module 153 over the second optical channel 180, but may transition over to be primarily transmitted by the third module 156 over the second optical channel 180.

In some embodiments, the first module 110 may send instructions to the second module 153 to send the first module 110 diagnostic monitor data, such as output transmit power at the transmitter 155 or bias current of the transmitter 155. Additionally or alternatively, the second module 153 may periodically transmit the diagnostic monitor data from the second module 153 to the first module 110. In these and other embodiments, when the first module 110 detects that the output transmit power or the bias current of the transmitter 155 is beyond a threshold level, the first module 110 may send an instruction to the second module 153 to stop transmitting via the transmitter 155. Additionally or alternatively, the first module 110 may send an instruction to the third module 156 to start transmitting via the transmitter 157. It will be appreciated that the same is true vice versa, e.g., the third module 156 may periodically transmit diagnostic monitor data and/or the third module may be instructed to stop transmitting via the transmitter 158 and the second module may be instructed to start transmitting via the transmitter 155.

In some embodiments, the first sub-module 153 and the second sub-module 156 may be part of a single device, rather than separate and distinct devices as illustrated in FIG. 1. In such an embodiment, the first module 110 may receive diagnostic data from one sub-module, and in response to the diagnostic data indicating a failure of the transmitter of the first sub-module (e.g., the transmit optical power being too low, the receiver optical power being too low, the bias current being too low or too high, etc.), the first module 110 may send two sets of instructions. A set of instructions may be sent to the first sub-module to stop transmitting via its transmitter and another set of instructions may be sent to a second sub-module to start transmitting via its transmitter.

Automatic Bit Error Ratio Adjustment

In some embodiments, instructions from the first module 110 to the second module 153 may be utilized to implement an automatic bit error ratio (BER) adjustment. For example, the first module 110 may be equipped with a forward error correction (FEC) chip that may measure the BER and provide feedback to the first host 111 to allow the first module 110 to adjust (e.g., optimize) its receive decision threshold. After the first module 110 has had the receive decision threshold adjusted, the first module 110 may send an instruction to the second module 153 to enable an optical loop back feature. Using such a feature, the second module 153 may transmit back to the first module 110 any data received by the second module 153. Using the data transmitted back, the first module 110 may monitor the BER of the data coming back. Based on the BER using the data coming back, the first module 110 may send instructions to the second module 153 to modify or otherwise adjust (e.g., optimize) the receive decision threshold of the second module 153. After the receive decision threshold for the second module 153 has been adjusted, the first module 110 may send instructions to the second module 153 to disable the optical loop back feature.

Security Check

In some embodiments, instructions from the first module 110 to the second module 1533 may be utilized to implement a security check. For example, the first module 110 may send a request to the second module 153 to verify security information. Such a request may take the form of a request for a device identification number, network identification number (such as a network address), security token, or other verifying information. In some embodiments, the request may include the first module 110 sending a read request for certain blocks of memory of the second module 150 that store identifying information regarding the second module 153.

In these and other embodiments, the first module 110 may determine whether the second module 153 meets a threshold security level (e.g., does the first module 110 recognize the second module 153?). If the second module 153 fails to meet the threshold security level, the first module 110 may take certain actions to address the lack of security. In some embodiments, the first module 110 may disable the receiver 114. Additionally or alternatively, the first module 110 may provide a notification to the first host 111 of the lack of security.

In addition to the traffic recovery system, automatic BER adjustment, and security check, other features or instructions may be sent from the first module 110 to the second module 153. For example, the first module 110 may send instructions to enable and/or disable a transmitter of the second module 153. As another example, the first module 110 may send instructions to adjust or tune a transmission wavelength of a transmitter of the second module 153. As an additional example, the first module 110 may send instructions to adjust a receive threshold of a receiver of the second module 153. As another example, the first module 110 may send instructions to enable and/or disable squelch of a receiver of the second module 153. As an additional example, the first module 110 may send instructions to receive diagnostic monitor values from the second module 153 (e.g., transmit and receive optical power, transmit bias current, module temperature, supply voltage, etc.). As another example, the first module 110 may send instructions to enable and/or disable clock and data recovery (CDR) of a transmitter and/or a receiver of the second module 153. As an additional example, the first module 110 may send instructions to enable and/or disable CDR optical loopback of the second module 153. As an additional example, the first module 110 may send instructions to lock an internal CDR at a specific data rate. As another example, the first module 110 may send instructions to perform a read and/or write command to certain memory locations (e.g., pages A0h and/or A2h in the case of SFP transceivers) of the second module 153. As an additional example, the first module 110 may send instructions to update firmware or other settings of the second module 153. As another example, the first module 110 may send instructions to reset a microcontroller of the second module 153. As another example, the first module 110 may send instructions to control lights embedded in the second module 153 (e.g., pull-tab LED lights). As an additional example, the first module 110 may exchange host-specific or network-specific data with the second module 153 (e.g., diagnostic data, ID data, administration data, operation data, maintenance data, provision sets of information, commands, etc.). As another example, the first module 110 may send instructions to negotiate a connection with the second module 153 at a particular or different bit rate.

Same Side Communications

In some embodiments, instructions, queries, etc. or other messages may be communicated between modules on the same side of the network 160. For example, the second module 153 may communicate with and/or otherwise provide instructions to the third module 156. Such communication may be similar or comparable to that described in the present disclosure between any of the communications between modules at opposite ends (e.g., near vs. far) of the network 160.

Mid-Stream Communications

In some embodiments, the network 160 may include one or more optical network components that may be disposed mid-stream between the near end and far end of the network 160. For example, there may be such a component on the first optical channel 170 and/or the second optical channel 180. Such a component may perform one or more maintenance tasks on an optical signal, such as amplification, regeneration, adding a channel, dropping a channel, etc. For example, there may be a first span along the first optical channel 170 from the first module 110 to one of these mid-stream components, and a second span from the mid-stream component to the second module 153.

In some embodiments the first module 110 may communicate instructions to one or more of these mid-stream components. For example, instructions may be provided to add one or more channels, drop one or more channels, equalize or otherwise modify power, tune one or more filters, report diagnostic information, etc. In some embodiments, these mid-stream components may be passive or otherwise unable to communicate responses out from the mid-stream component. However, even in such embodiments, the mid-stream components may receive and execute instructions from the first module 110. While described as the first module 110 providing instructions to a mid-stream component, it is equally applicable that any other module (e.g., the second module 153 and/or the third module 156) may also provide instructions to one or more mid-stream components.

While various examples of interactions between the first module 110 and the second module 153 have been provided, it will be appreciated that the same interactions are equally applicable between the first module 110 any other number of modules, including, for example, the third module 156.

Figure 5:
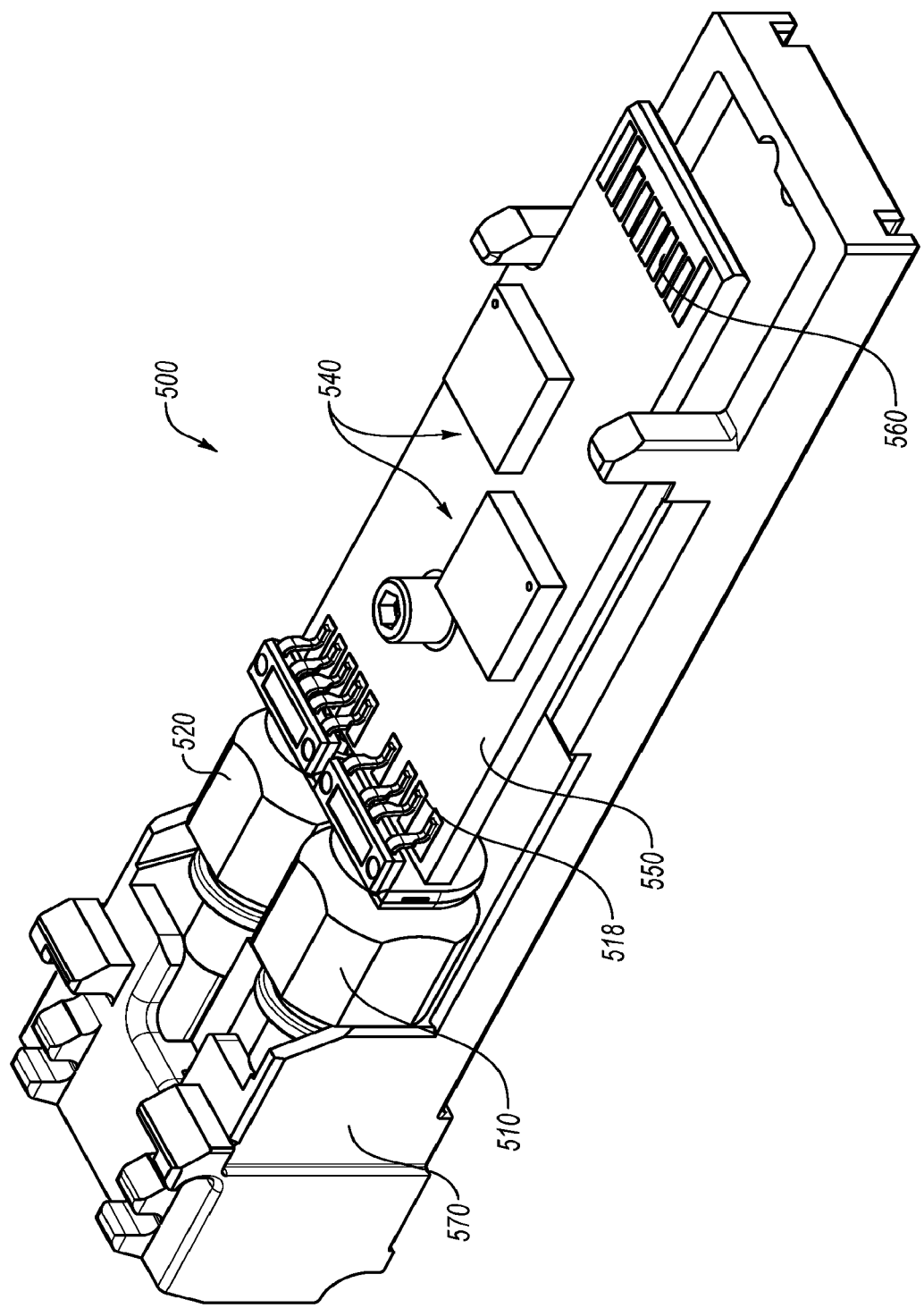
FIG. 5 is a perspective view of an example module.

In some embodiments, the first module 110, the second module 153, and/or the third module 156 may be implemented as the module illustrated in FIGS. 5 and/or 6.

Modifications, additions, or omissions may be made to FIG. 1 without departing from the scope of the present disclosure. For example, the network system 100 may include more or fewer elements than those illustrated and described in the present disclosure. For example, the network system 100 may include any number of optical channels. As another example, the network system 100 may be implemented in any location, such as a mobile front haul network, a mobile back haul network, a metropolitan network, etc. As an additional example, any number of configuration of modules may be implemented, and any routing of optical channels between those modules is contemplated.

Figure 2:
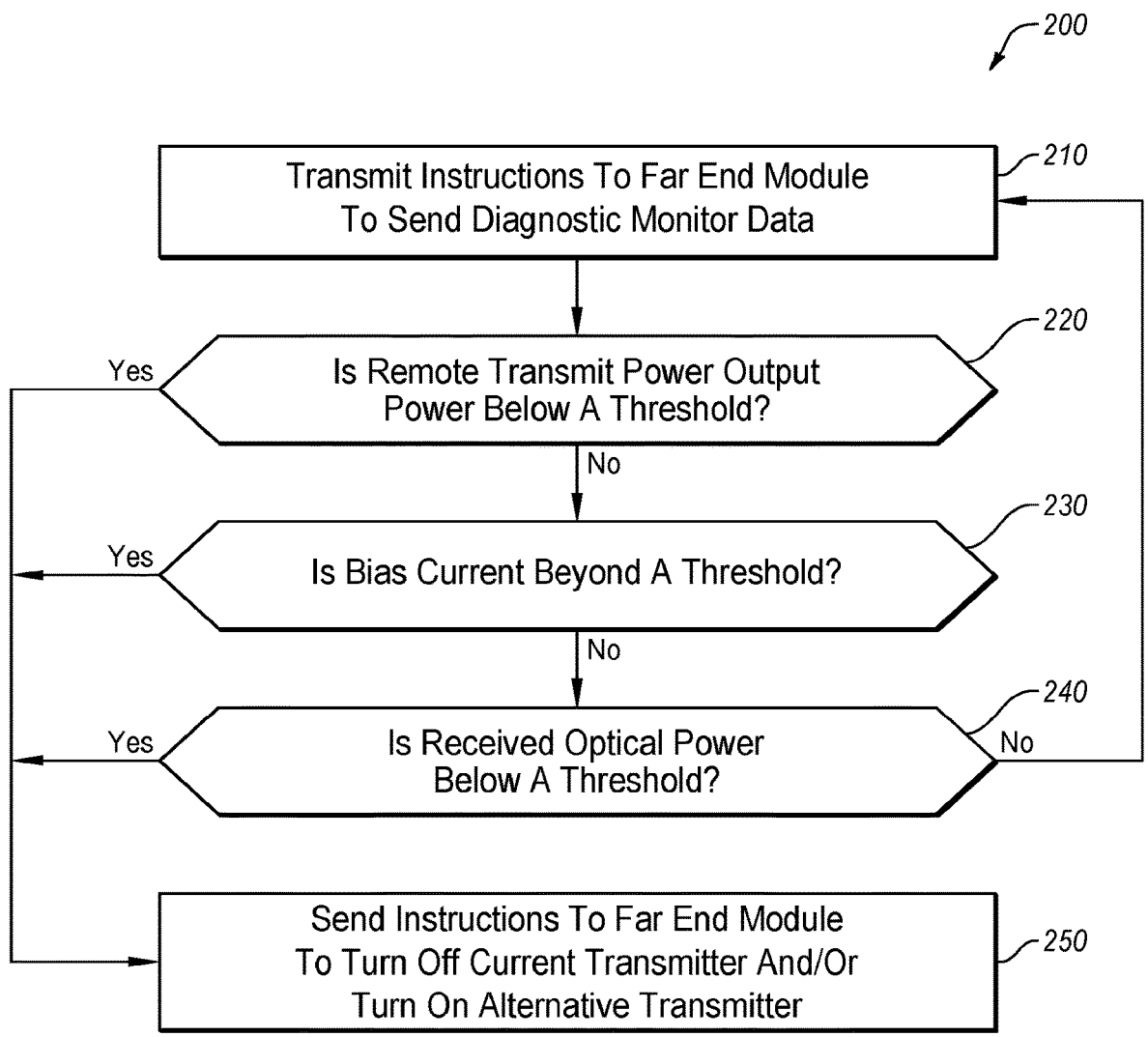
FIG. 2 is a flow chart of an example method of far end network control.

FIG. 2 is a flow chart of an example method 200 of far end network control, in accordance with one or more embodiments of the present disclosure. The method 200 may be performed by any suitable system, apparatus, or device. For example, the network system 100, the first module 110, and/or the second module 150 of FIG. 1 may perform one or more of the operations associated with the method 200. Although illustrated with discrete blocks, the steps and operations associated with one or more of the blocks of the method 200 may be divided into additional blocks, combined into fewer blocks, or eliminated, depending on the desired implementation.

At block 210, instructions may be transmitted from a near end module to a far end module (e.g., from the first module 110 to the second module 150 of FIG. 1) to send diagnostic monitor data. For example, the near end module may instruct the far end module to transmit diagnostic data about the far end module such as transmit optical power, bias current, etc. In these and other embodiments, the instructions may direct the far end module to periodically transmit the diagnostic monitor data, or such data may be periodically provided from the far end module to the near end module without any instructions from the near end module to the far end module.

At block 220, the near end module may determine whether the remote transmit power is below a threshold. If the remote transmit power (e.g., the transmit power at the far end module) is below a threshold, the method 200 may proceed to block 250. If the remote transmit power is not below a threshold, the method 200 may proceed to block 230.

At block 230, the near end module may determine whether the bias current of the far end module is beyond a threshold. If the bias current is beyond the threshold, the method 200 may proceed to the block 250. If the bias current is not beyond the threshold, the method 200 may proceed to the block 240.

At block 240, the near end module may determine whether the received optical power at the near end module is below a threshold. If the received optical power is below the threshold, the method 200 may proceed to the block 250. If the received optical power is not below the threshold, the method 200 may return to the block 220.

At block 250, instructions may be sent to the far end module to turn off a current transmitter and/or to turn on an alternative transmitter. For example, a first instruction may be sent to a first far end module currently acting as a primary communicating module to turn off the transmitter of the first far end module. Additionally or alternatively, a second instruction may be sent to a second far end module currently acting as a backup communicating module to turn on the transmitter of the second far end module. In these and other embodiments, the transmitter to be turned off and/or on may be on the same module or may be on another module. For example, a first module may receive an instruction to turn off a defective transmitter and turn on an effective transmitter. The first module may turn off a first transmitter of the first module and turn on a second transmitter of the first module. Alternatively, the first module may turn off a first transmitter on the first module and may transmit an instruction to a second module at the far end to turn on an effective transmitter.

Accordingly, the method 200 may perform far end network control. Modifications, additions, or omissions may be made to the method 200 without departing from the scope of the present disclosure. For example, one or more of the blocks 210, 220, 230, and/or 240 may be omitted. As another example, the operations of the method 200 may be implemented in differing order. Additionally or alternatively, two or more operations may be performed at the same time. As an additional example, any one of the blocks 220, 230, and/or 240 may be omitted and any one of the inquiries may be sufficient to proceed to block 250 and/or return to block 220 of the method 200. As another example, in some embodiments, the method 200 may return to the block 210 to additionally request diagnostic monitor data. Furthermore, the outlined operations and actions are provided as examples, and some of the operations and actions may be optional, combined into fewer operations and actions, or expanded into additional operations and actions without detracting from the essence of the disclosed embodiments.

Figure 3:
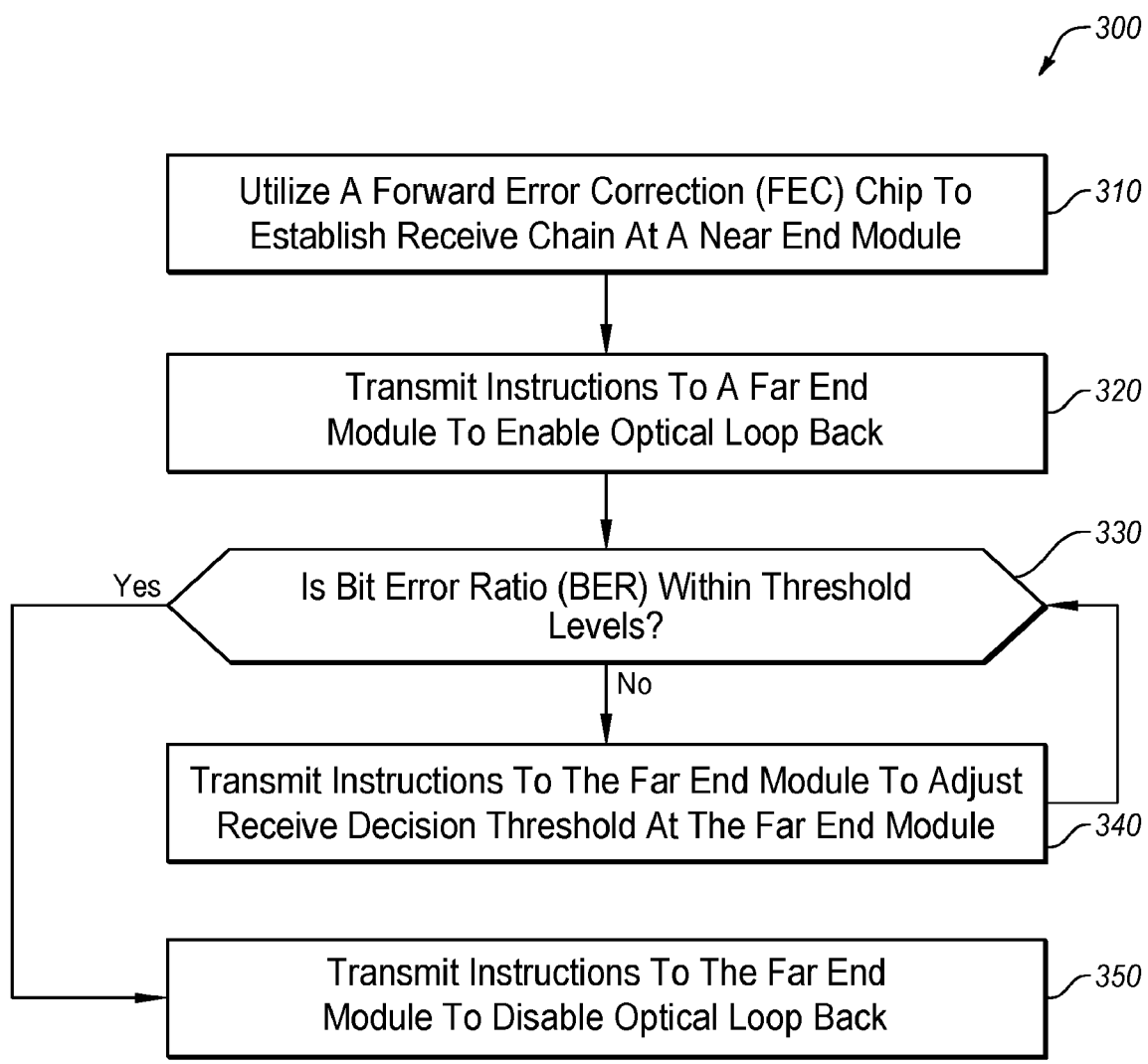
FIG. 3 is a flow chart of another example method of far end network control.

FIG. 3 is a flow chart of another example method 300 of far end network control, in accordance with one or more embodiments of the present disclosure. The method 300 may be performed by any suitable system, apparatus, or device. For example, the network system 100, the first module 110, and/or the second module 150 of FIG. 1 may perform one or more of the operations associated with the method 300. Although illustrated with discrete blocks, the steps and operations associated with one or more of the blocks of the method 300 may be divided into additional blocks, combined into fewer blocks, or eliminated, depending on the desired implementation.

At block 310, a forward error correction (FEC) chip may be used at a near end of a network system (e.g., by the first module 110 and/or the first host 111 of the network system 100 of FIG. 1) to establish a receive chain. For example, a host at the near end of the network system may adjust (e.g., optimize) a receive decision threshold at the near end module using the FEC.

At block 320, instructions may be transmitted from the near end module to a far end module to enable an optical loop back feature. When such an optical loop back feature is enabled, the far end module may loop back (e.g., transmit back to its origin) data received at the far end module from the near end module.

At block 330, a determination may be made as to whether the BER of the far end module is within a threshold level. For example, using the looped back data enabled at block 320, the near end host may use the FEC chip to analyze the BER for the far end module. If it is determined that the BER is within the threshold level, the method 300 may proceed to the block 350. If it is determined that the BER is not within the threshold level, the method 300 may proceed to the block 340 to adjust the BER based on the looped back data. In these and other embodiments, the threshold level may include an optimization to verify that the BER has been optimized.

At block 340, instructions may be transmitted from the near end module to the far end module to adjust a receive decision threshold of the far end module. After the block 340, the method 300 may proceed to the block 330. In some embodiments, by returning to the block 330 and proceeding again to the block 340, the method 300 may continue to adjust the far end module using an FEC chip at the near end host until the far end module BER is within the threshold level.

At block 350, instructions may be transmitted from the near end module to the far end module to disable the optical loop back feature. In these and other embodiments, the block 350 may otherwise return the network system to normal operation after the BER has been optimized at both ends of an optical communication stream.

Accordingly, the method 300 may perform far end network control. Modifications, additions, or omissions may be made to the method 300 without departing from the scope of the present disclosure. As another example, the operations of the method 300 may be implemented in differing order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

Figure 4:
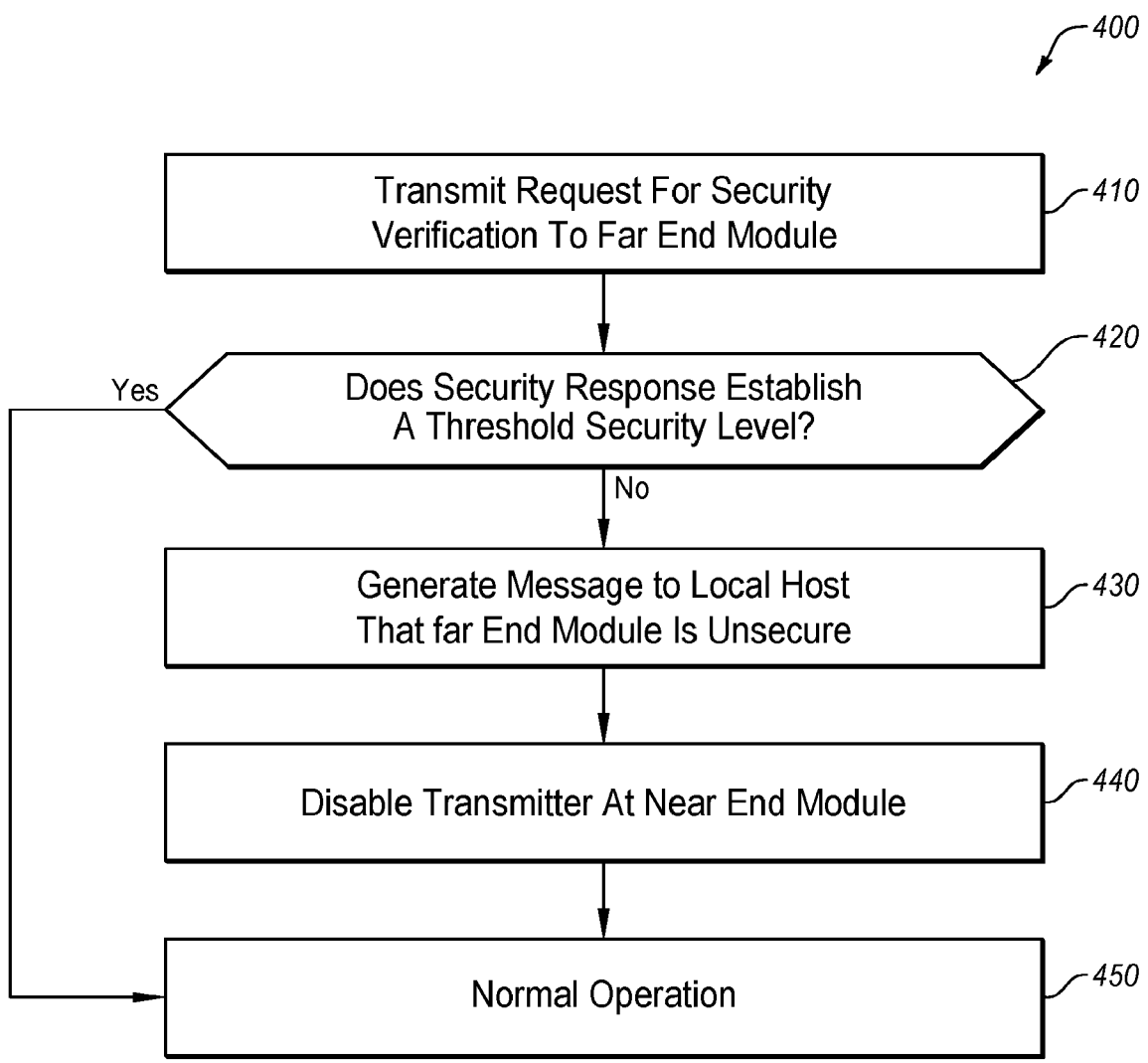
FIG. 4 is a flow chart of an additional example method of far end network control.

FIG. 4 is a flow chart of an additional example method 400 of far end network control, in accordance with one or more embodiments of the present disclosure. The method 400 may be performed by any suitable system, apparatus, or device. For example, the network system 100, the first module 110, and/or the second module 150 of FIG. 1 may perform one or more of the operations associated with the method 400. Although illustrated with discrete blocks, the steps and operations associated with one or more of the blocks of the method 400 may be divided into additional blocks, combined into fewer blocks, or eliminated, depending on the desired implementation.

At block 410, a request may be transmitted from a near end module to a far end module (e.g., from the first module 110 to the second module 150 of FIG. 1) for security verification. Such a request may take any form as described in the present disclosure.

At block 420, a determination may be made by the near end module as to whether the security response from the far end module establishes a threshold security level. For example, the far end module may provide a device ID or network ID that is recognized by the near end module. If the security response establishes the threshold security level, the method 400 may proceed to block 450. If the security response fails to establish the threshold security level, the method may proceed to the block 430.

At block 430, a message may be generated by the near end module to the near end host that the far end module is unsecure. For example, the near end module may indicate that the near end module does not recognize the far end module. Additionally or alternatively, the unsecure connection may be flagged to the near end host, the far end host, or both.

At block 440, the near end module may disable the near end transmitter. By disabling the near end module transmitter, data (whether secure or otherwise) may not be transmitted from the near end module to the far end module. The near end module may still receive data from the far end module, but may not send data to the far end module. Additionally or alternatively, any other software and/or hardware features at the near end and/or the far end module may be disabled in response to the unsecure connection.

At block 450, the network system may proceed with normal operation. For example, if the near end module is able to verify the identity of the far end module or otherwise establish a threshold security level, the near end module may continue to transmit data to the far end module.

Accordingly, the method 400 may perform far end network control. Modifications, additions, or omissions may be made to the method 400 without departing from the scope of the present disclosure. As another example, the operations of the method 400 may be implemented in differing order. For example, the blocks 430 and/or 440 may be omitted such that one or the other is performed, and/or switched in order. Additionally or alternatively, two or more operations may be performed at the same time. Furthermore, the outlined operations and actions are provided as examples, and some of the operations and actions may be optional, combined into fewer operations and actions, or expanded into additional operations and actions without detracting from the essence of the disclosed embodiments.

The methods 200, 300, 400 of FIGS. 2-4 may be implemented alone or together in any combination.

Embodiments of the present disclosure may be implemented in various optoelectronic modules or devices. As used herein, the terms "optoelectronic module" and "optoelectronic device" includes devices having both optical and electrical components. Examples of optoelectronic devices include, but are not limited to optical transceiver modules ("optical transceivers"), transmitters, and/or receivers. FIG. 5 illustrates an example optical transceiver 510 in which the principles of the present disclosure may be employed. The principles of the present disclosure allow for the optical transceiver 500 to perform far end network control. While the optical transceiver 500 will be described in some detail, the optical transceiver 500 is described by way of illustration only, and not by way of restricting the scope of the present disclosure.

As illustrated in FIG. 5, an example transceiver module 500 includes a transmitter optical subassembly ("TOSA") 510, a receiver optical subassembly ("ROSA") 520, a printed circuit board (PCB) 550 and a housing 570 for containing the components of the transceiver module 500. TOSA 510 and ROSA 520 may be configured to be electrically and/or mechanically connected to PCB 550. In some embodiments, TOSA 510 and ROSA 520 may be connected to PCB 550 using a lead frame connector 518. Other structures may be used to connect TOSA 510 and ROSA 520 to PCB 550 such as, but not limited to, flexible circuits, through-hole connections, and surface-mount connections. The PCB 550 may include an edge connector 560.

Optoelectronic devices, such as the transceiver module 500, can be constructed, for example, to be compatible with one or more 10 Gigabit Small Form Factor Pluggable (XFP) Multi Source Agreement (MSA) standards, including those set forth in the XFP MSA Group. More generally, the principles of the present invention may be implemented in optoelectronic devices of any form factor such as XFP, Small Form Factor Pluggable (SFP), enhanced Small Form Factor Pluggable (SFP+), and Small Form Factor (SFF), without restriction. It will be appreciated, however, that the optoelectronic devices need not comply with standardized form factor requirements and may have any size or configuration necessary according to a particular design. The principles of the present disclosure are suitable for 1G, 2G, 4G, 10G, 16G, and higher bandwidth fiber channels.

The TOSA 510 may include a light source (not shown) having any suitable configuration including, but not limited to, a distributed feedback ("DFB") laser, a VCSEL, a cooled or uncooled EML, an EML with a wavelocker, a Fabry-Perot laser, a laser emitting diode ("LED"), etc. The ROSA 520 may include, for example, a photodiode, an avalanche photodiode (APD), positive-intrinsic-negative photo diodes (PIN), etc. In some embodiments, the transceiver module 500 may include a temperature-compensated externally modulated laser (EML) for use in dense wavelength division multiplexing applications (DWDM) and therefore be more completely described as a DWDM EML XFP transceiver module.

As illustrated in FIG. 5, the PCB 550 may include circuitry and electronic components 540 for use with the TOSA 510 and the ROSA 520 in performing the optical signal transmission and reception activities of the transceiver module 500. The components 540 may include a laser driver, a post amplifier, a controller chip, and persistent memory. These components are described more fully below. It will be appreciated that one or more of these components may be integrated on a single chip, or may be separately disposed on the PCB 550. In some embodiments, the transceiver module 500 may use the controller chip to transmit instructions to a far end module. For example, the controller chip may cooperate with the laser driver, post amplifier, and other components within the transceiver module 500 to generate and transmit instructions to a far end module and/or to receive a response from the far end module (e.g., diagnostic monitoring data from the far end module). Alternatively, the transceiver module 500 may be implemented as a far end module in which case the controller chip may cooperate with the laser driver, post amplifier, and/or other components to receive, respond to, and/or execute instructions received from a near end module.

Figure 6:
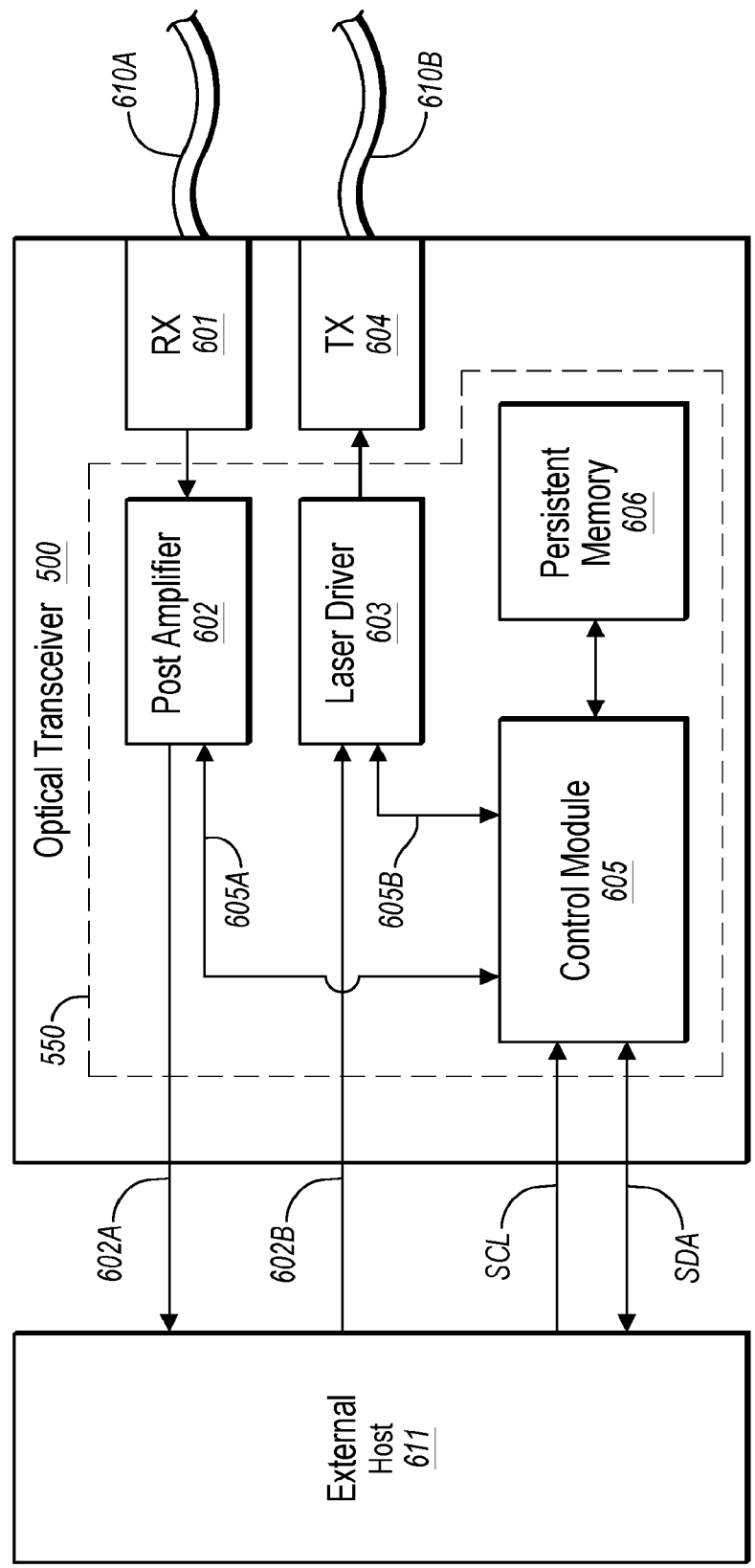
FIG. 6 is a block diagram of various aspects of the example module of FIG. 5.

FIG. 6 illustrates various components of the transceiver module 500 of FIG. 5, in accordance with one or more embodiments of the present disclosure. For example, FIG. 6 may illustrate the interaction between the transceiver module 500, a host system such as an external host 611, and fiber optic cables 610A, 610B. The transceiver module 500 illustrated in FIG. 6 may represent a simplified block diagram of a transceiver such as that shown at 500 in FIG. 5.

In operation, the optical transceiver 500 may receive an optical signal from the fiber 610A using an optical receiver 601, which may correspond to the ROSA 520 of FIG. 5. The receiver 601 may act as an opto-electric transducer by transforming the optical signal into an electrical signal. The receiver 601 may provide the resulting electrical signal to a post-amplifier 602. The post-amplifier 602 may amplify the signal and provide the amplified signal to the external host 611 as represented by arrow 602A. The external host 611 may be any computing system capable of communicating with the optical transceiver 500. In some embodiments, the optical transceiver 500 may be integrated with the external host 611 in the form of a printed circuit board or other components/chips within the external host 611. Additionally or alternatively, some components of the optical transceiver 500 may reside on the external host 611 while other components of the optical transceiver 500 may reside on a printed circuit board separate from the external host 611.

In some embodiments, the optical transceiver 500 may receive electrical signals from the external host 611 for transmission onto the fiber 610B. In these and other embodiments, a laser driver 603 may receive the electrical signal as represented by the arrow 603A, and may drive an optical transmitter 604, which may correspond to the TOSA 510 of FIG. 5. The transmitter 604 may include any suitable light source, such as a laser or light emitting diode ("LED") that is driven by the electrical signals provided by the external host 611, thereby causing the light source to emit onto the fiber 610B optical signals representative of the information carried in the electrical signal. Additionally or alternatively, the transmitter 604 may cause the light source to emit onto the fiber 610B optical signals representative of instructions directly from the optical transceiver 500 to a module on the other end of the fiber 610B. Accordingly, the optical transmitter 604 may serve as an electro-optic transducer.

The behavior of the optical receiver 601, the post-amplifier 602, the laser driver 603, and the optical transmitter 604 may vary dynamically due to a number of factors. For example, temperature changes, power fluctuations, and feedback conditions may each affect the performance of these components. Accordingly, the transceiver module 500 may include a control module 605, which may evaluate environmental conditions, such as temperature, and/or operating conditions, such as voltage, and receive information from the post-amplifier 602 (as represented by arrow 605A) and from the laser driver 603 (as represented by arrow 605B). Receiving such information may allow the control module 605 to optimize the dynamically varying performance, and additionally detect when there is a loss of signal. For example, the control module 605 may optimize the operation of the transceiver module 500 by adjusting settings on the post-amplifier 602 and/or the laser driver 603 as represented by the arrows 605A and 605B. These settings adjustments may be intermittent and are typically made when temperature or voltage or other low frequency changes so warrant. In some embodiments, the control module 605 may interpret messages from a far end module and/or generate instructions to a far end module. In some embodiments, the control module 605 may interpret instructions from a near end module, generate responses to a near end module, and/or execute instructions from a near end module. In some embodiments, the control module 605, the post-amplifier 602, and the laser driver 603 may be the same chip. Additionally or alternatively, the control module 605, the post-amplifier 602, and the laser driver 603 may be distributed across multiple chips.

The control module 605 may have access to a persistent memory 606, which in one embodiment, is an Electrically Erasable and Programmable Read Only Memory (EEPROM). Persistent memory 606 may also include any other non-volatile memory source. The persistent memory 606 and the control module 605 may be embodied in a single device or in different devices without restriction.

In some embodiments, data and clock signals may be provided from the external host 611 to the control module 605 using the serial clock line SCL, and the serial data line SDA. Additionally or alternatively, data may be provided from the control module 605 to the external host 611 using serial data signal SDA to allow for transmitting diagnostic data such as environmental and/or operational parameters.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of a computing system. In some embodiments, the different components, modules, engines, and services described in the present disclosure may be implemented as objects or processes that execute on a computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In this description, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," the term "containing" should be interpreted as "containing, but not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
    establishing, in association with a first module associated with a host device, a predetermined threshold security level;
    transmitting a first message from the first module to a second module, the first message requesting security verification information of the second module, the first module and the second module optically coupled to one another via an optical transmission link;
    receiving, at the first module, a response having the security verification information of the second module;
    determining that the security verification information of the response from the second module does not establish the predetermined threshold security level; and
    generating a second message from the first module for the host device, the second message indicating that the second module is unsecure in response to the determination that the second module does not establish the predetermined threshold security level.

2. The method of claim 1, further comprising preventing transmission of data from the first module to the second module.

3. The method of claim 1, further comprising proceeding to a normal operation mode in response to a determination that the second module establishes the predetermined threshold security level.

4. The method of claim 1, wherein the first module is configured to communicate with the second module at a physical layer without having to send to a second host device associated with the second module.

5. The method of claim 1, wherein the first module is configured to communicate with the second module using an out-of-band communication that is out-of-band with normal network traffic over the optical transmission link.

6. The method of claim 1, further comprising receiving customer data at the first module from the second module.

7. A method, comprising:
    establishing, in association with a first module, a predetermined threshold security level;
    transmitting a first message from the first module to a second module via an optical transmission link, the first message requesting security verification information of the second module, the first module optically coupled to the second module via an optical transmission link;
    receiving, at the first module, a response having the security verification information of the second module;
    determining, at the first module, that the security verification information of the response from the second module does not establish the predetermined threshold security level; and
    disabling a transmitter of the first module for the optical transmission link in response to the determination that the second module does not establish the predetermined threshold security level.

8. The method of claim 7, wherein the first module is associated with a host device, the method further comprising generating, from the first module to the host device, a second message indicating that the second module is unsecure in response to the determination that the second module does not establish the predetermined threshold security level.

9. The method of claim 7, further comprising continuing to receive data at a receiver of the first module from the second module while the transmitter of the first module is disabled.

10. The method of claim 7, further comprising proceeding to a normal operation mode in response to a determination that the second module establishes the predetermined threshold security level.

11. The method of claim 7, wherein the first module is configured to communicate with the second module using an out-of-band communication.

12. The method of claim 8, wherein the steps of determining and disabling alternatively comprise the steps of:
- determining, at the first module, that the security verification information of the response from the second module establishes the predetermined threshold security level; and
- proceeding to a normal operation mode in response to the determination that the second module establishes the predetermined threshold security level, wherein the normal operation mode includes transmission of data from the first module to the second module via the optical transmission link.

13. A first module to communicate with a second module via an optical transmission link, the first module associated with a host device, the first module comprising:
- a transmitter configured to transmit optical signals via the optical transmission link;
- a receiver configured to receive optical signals via the optical transmission link; and
- a control module in communication with the transmitter, the receiver, and the host device, the control module configured to:
  - establish, in association with the first module, a predetermined threshold security level;
  - transmit, via the transmitter to the second module via the optical transmission link, a request requesting security verification information;
  - receive, via the receiver, a first type of response having the security verification information from the second module;
  - determine that the security verification information of the first type of response does not establish the predetermined threshold security level; and
  - generate a message from the first module for the host device, the second message indicating that the second module is unsecure in response to the determination.

14. The first module of claim 13, wherein the control module is further configured to:
- receive, via the receiver, a second type of response having the security verification information from the second module;
- determine that the security verification information of the second type of response establishes the predetermined threshold security level; and
- proceed to a normal operation mode with respect to the second module in response to the determination.

15. The first module of claim 13, wherein the control module is further configured to disable the transmitter in response to the determination that the second module does not establish the predetermined threshold security level.

16. A first module to communicate with one or more second modules via an optical transmission link, the first module comprising:
- a transmitter configured to transmit optical signals via the optical transmission link;
- a receiver configured to receive optical signals via the optical transmission link; and
- a control module in communication with the transmitter, the receiver, and the host device, the control module configured to:
  - establish, in association with the first module, a predetermined threshold security level;
  - transmit, via the transmitter to the one or more second modules via the optical transmission link, a request requesting security verification information;
  - receive, via the receiver, a response having the security verification information from a first of the one or more second modules;
  - determine that the security verification information of the response does not establish the predetermined threshold security level; and
  - disable the transmitter of the first module with respect to the first of the one or more second modules in response to the determination.

17. The first module of claim 16, wherein the control module is further configured to:
- receive, via the receiver, a second type of response having the security verification information from a second of the one or more second module;
- determine that the security verification information of the second type of response establishes the predetermined threshold security level; and
- proceed to a normal operation mode with respect to the second of the one or more second modules in response to the determination.

18. The first module of claim 16, wherein the request is transmitted directly from the first module to the second module without having a host or other external component required to interpret or implement the request.

19. The first module of claim 16, wherein the request is a request for a device identifier of the second module to be recognized by the first module, a request for a network identifier of the second module to be recognized by the first module, a request for a security token of the second module to be recognized by the first module; or a read request for a block of memory of the second module that stores the security verification information for the second module.

* * * * *